United States Patent
Aoki

(10) Patent No.: US 10,946,472 B2
(45) Date of Patent: Mar. 16, 2021

(54) SPOT WELDING SYSTEM INCLUDING TIP DRESSER FOR POLISHING ELECTRODE

(71) Applicant: FANUC CORPORATION, Yamanashi (JP)

(72) Inventor: Toshimichi Aoki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 255 days.

(21) Appl. No.: 15/844,845

(22) Filed: Dec. 18, 2017

(65) Prior Publication Data

US 2018/0178311 A1  Jun. 28, 2018

(30) Foreign Application Priority Data

Dec. 22, 2016 (JP) .............................. JP2016-249891

(51) Int. Cl.
| | | |
|---|---|---|
| *B23K 11/31* | (2006.01) | |
| *B23K 11/30* | (2006.01) | |
| *B23K 9/24* | (2006.01) | |

(52) U.S. Cl.
CPC ........ *B23K 11/314* (2013.01); *B23K 11/3063* (2013.01); *B23K 9/24* (2013.01); *B23K 11/3009* (2013.01)

(58) Field of Classification Search
CPC .............. B23K 11/314; B23K 11/3063; B23K 11/3009; B23K 11/3072; B23K 9/24
USPC .............. 219/86.25, 86.1, 86.33, 86.41, 91.1
See application file for complete search history.

(56) References Cited

U.S. PATENT DOCUMENTS

| | | | |
|---|---|---|---|
| 5,445,481 A | 8/1995 | Nakajima et al. | |
| 6,623,334 B1 | 9/2003 | Birang et al. | |
| 7,458,139 B2 * | 12/2008 | Nakazima | ............... B23B 5/166 29/33 R |
| 7,789,600 B2 | 9/2010 | Goto et al. | |
| 9,517,527 B2 | 12/2016 | Moision et al. | |
| 9,662,739 B2 | 5/2017 | Aoki | |
| 10,315,271 B2 | 6/2019 | Aoki | |
| 2005/0112998 A1 | 5/2005 | Matsuo et al. | |
| 2007/0127998 A1* | 6/2007 | Shim, II | ............. B23K 11/3063 409/139 |

(Continued)

FOREIGN PATENT DOCUMENTS

| | | |
|---|---|---|
| CN | 101232966 A | 7/2008 |
| CN | 104801843 A | 7/2015 |

(Continued)

OTHER PUBLICATIONS

Machine translation of JP 2013-126699 performed on Oct. 24, 2019.*

(Continued)

*Primary Examiner* — Tu B Hoang
*Assistant Examiner* — Alba T Rosario-Aponte
(74) *Attorney, Agent, or Firm* — RatnerPrestia

(57) ABSTRACT

A spot welding system includes a spot welding gun, a robot, and a tip dresser that polishes a face of electrode. The tip dresser includes a blade that cuts the face of the electrode and a blade driving motor that rotates the blade. A dresser control section of a control device detects torque of the blade driving motor. When the torque of the blade driving motor exceeds a predetermined torque upper limit value, the dresser control section carries out speed reduction control that reduces the rotation speed of the blade driving motor.

4 Claims, 9 Drawing Sheets

(56) References Cited

U.S. PATENT DOCUMENTS

| | | | |
|---|---|---|---|
| 2015/0034608 A1 | 2/2015 | Mori et al. | |
| 2015/0044945 A1* | 2/2015 | Nakajima | B23K 11/115 451/5 |
| 2015/0321283 A1* | 11/2015 | Hatada | B23K 11/3063 219/86.25 |
| 2016/0023296 A1 | 1/2016 | Aoki | |

FOREIGN PATENT DOCUMENTS

| | | | |
|---|---|---|---|
| CN | 204603557 U | | 9/2015 |
| DE | 69306490 T2 | | 4/1997 |
| DE | 102015005606 A1 | | 11/2015 |
| DE | 102015009223 A1 | | 1/2016 |
| JP | H04356378 A | | 12/1992 |
| JP | H07227759 A | | 8/1995 |
| JP | 07256556 A | * | 10/1995 |
| JP | H07256556 A | | 10/1995 |
| JP | 11254311 A | * | 9/1999 |
| JP | H11254311 A | | 9/1999 |
| JP | 2000084849 A | | 3/2000 |
| JP | 2001110768 A | | 4/2001 |
| JP | 2005131732 A | | 5/2005 |
| JP | 2006341271 A | | 12/2006 |
| JP | 2008-207189 A | | 9/2008 |
| JP | 2008207189 A | * | 9/2008 |
| JP | 2013126699 A | | 6/2013 |
| JP | 2013126699 A | * | 6/2013 |
| JP | 2014-100729 A | | 6/2014 |
| JP | 2015-030000 A | | 2/2015 |
| JP | 2015213937 A | | 12/2015 |
| JP | 2016022524 A | | 2/2016 |

OTHER PUBLICATIONS

Machine translation of JP 2008-207189 performed on Oct. 24, 2019.*
Machine translation of JP 07-256556 performed on Oct. 25, 2019.*
Machine translation of JP 11-254311 performed on Oct. 24, 2019.*

* cited by examiner

SPOT WELDING SYSTEM INCLUDING TIP DRESSER FOR POLISHING ELECTRODE

CROSS-REFERENCE TO RELATED APPLICATIONS

This application is a new U.S. Patent Application that claims benefit of Japanese Patent Application No. 2016-249891, filed Dec. 22, 2016, the disclosure of this application is being incorporated herein by reference in its entirety for all purposes.

BACKGROUND OF THE INVENTION

1. Field of the Invention

The present invention relates to a spot welding system that includes a tip dresser for polishing an electrode.

2. Description of the Related Art

A spot welding system that includes a spot welding gun and a robot has been known in the related art. The robot moves a workpiece or the spot welding gun. The spot welding gun sandwiches a metal plate or the like between a pair of electrodes. Then, by sending a current through the electrodes, a spot weld can be made at a predetermined spot.

Impurities are built up on the face of the electrode when the spot welding gun repeats welds. For example, metal that has melted during spot welding is built up on the electrode. It is known that the face of an electrode is polished in order to remove foreign matter from the face of the electrode in the related art. A device that polishes the face of the electrode is referred to as a tip dresser. The tip dresser includes a blade that cuts the face of the electrode. The face of the electrode can be milled by pressing the electrode against the blade while the blade is rotating (for example, see Japanese Unexamined Patent Publication No. 2014-100729A and Japanese Unexamined Patent Publication No. 2008-207189A).

Japanese Unexamined Patent Publication No. 2015-30000A discloses a welding system that includes a dresser that polishes a welding tip. This welding system includes an instruction unit that instructs the polishing of the welding tip to stop when the polishing is to be stopped. The instruction unit specifies a pressure for pressing the welding tip against the dresser so that the torque at which a polishing disk of the dresser rotates is increased within a range that is not greater than a predetermined upper limit value.

SUMMARY OF THE INVENTION

When an electrode is polished by a tip dresser, the electrode is pressed against the blade. There are cases where the force at which the electrode is pressed increases while the polishing is performed. In such a case, the rotation speed of the blade drops. When a control for keeping the rotation speed of the blade at a constant speed is carried out, the torque of the motor that rotates the blade increases. As a result, there are cases where an excessive load is applied to the constituent component of the tip dresser. For example, in the case where the cutting performance of the blade is degraded, a greater torque is required for polishing at a predetermined rotation speed. As a result of an increase in the current that is supplied to the motor, the excessive load may be applied to the motor, a reducer, a bearing, a blade, and the like.

An excessive load that is applied on the constituent component of the tip dresser causes problems such as damage to the component, shorter component lifespan, and the like. For example, there have been problems such as blade chipping, the shorter lifespans in the reducer and the bearing, and the like.

A spot welding system according to one aspect of the present disclosure includes a spot welding gun that includes a pair of electrodes arranged so as to face each other, and a robot configured to change a position and an orientation of the spot welding gun. The spot welding system includes a tip dresser configured to polish a face of the electrode. The spot welding system includes a control device configured to control the spot welding gun and the tip dresser. The tip dresser includes a blade configured to cut the face of the electrode and a blade driving motor configured to rotate the blade. The control device includes a dresser control section configured to control the tip dresser. The dresser control section is configured to detect torque of the blade driving motor. When the torque of the blade driving motor exceeds a predetermined torque upper limit value, the dresser control section carries out speed reduction control that reduces a rotation speed of the blade driving motor.

DETAILED DESCRIPTION

A spot welding system according to an embodiment will be described with reference to FIG. 1 to FIG. 11. The spot welding system of the present embodiment includes a tip dresser serving as a polishing device that polishes an electrode.

Figure 1:
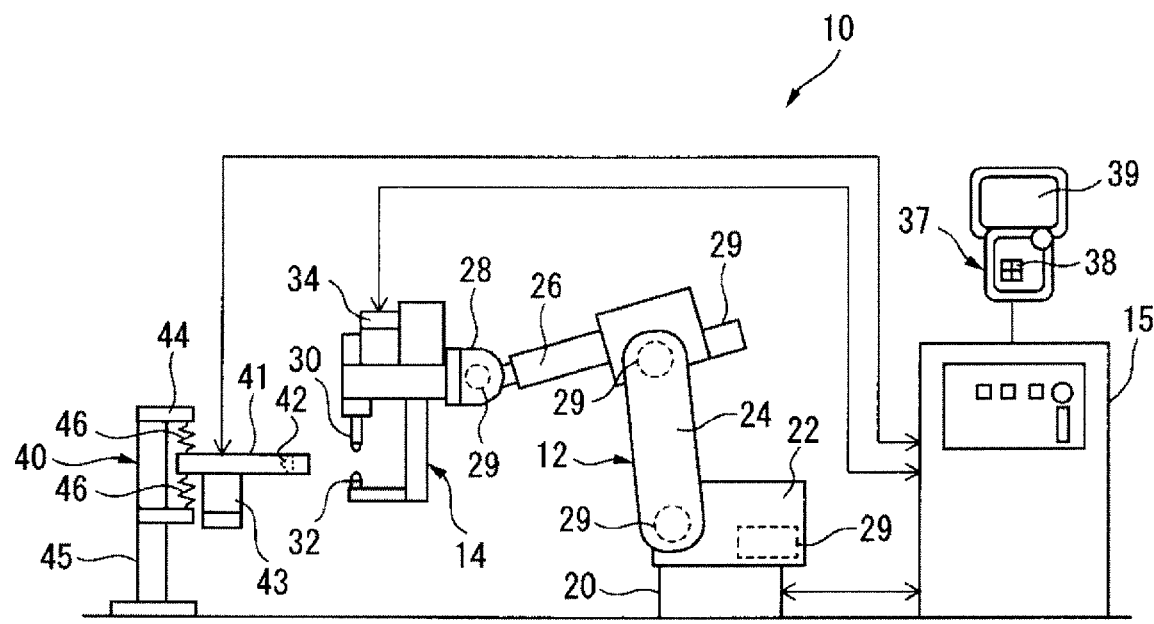
FIG. 1 is a schematic view of a spot welding system according to an embodiment.
Figure 2:
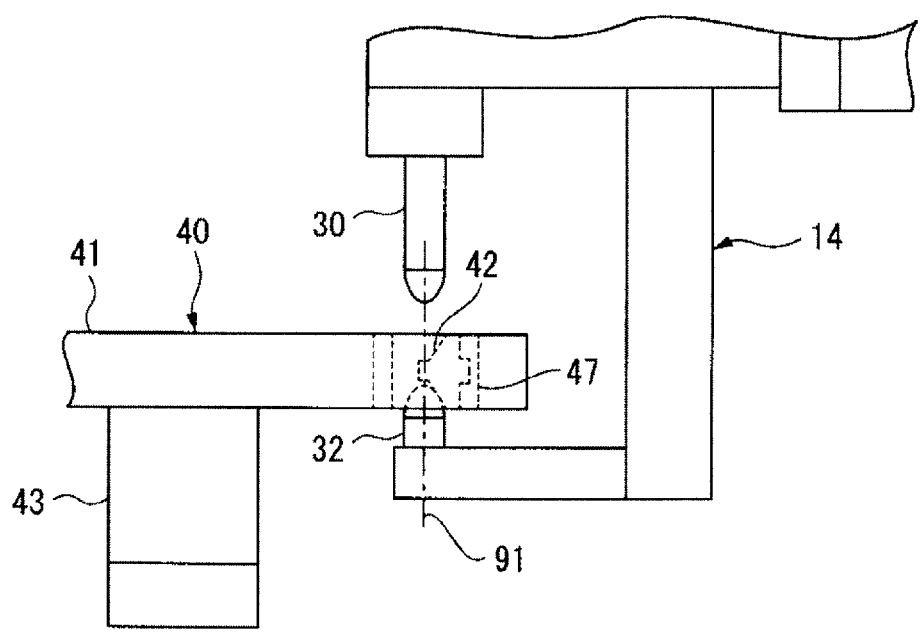
FIG. 2 is an enlarged schematic view of a pair of electrodes in a spot welding gun and a main body part of a tip dresser according to the embodiment.

FIG. 1 shows a schematic view of the spot welding system according to the present embodiment. FIG. 2 shows an enlarged schematic view of the spot welding gun and a main body part of the tip dresser according to the present embodiment. Referring to FIG. 1 and FIG. 2, a spot welding system 10 includes a robot 12 and a spot welding gun 14. The robot 12 of the present embodiment is an articulated robot that has a plurality of joint parts.

The spot welding system 10 includes a control device 15 that controls the robot 12 and the spot welding gun 14. The control device 15 is constituted of an arithmetic processing device that includes a central processing unit (CPU), a random access memory (RAM), a read-only memory (ROM), and the like, which are connected to each other via a bus. The robot 12 and the spot welding gun 14 are connected to the control device 15 via a communication device.

The spot welding system 10 is formed so as to be capable of changing the relative position and the orientation of the spot welding gun 14 with respect to a workpiece. The robot 12 moves the spot welding gun 14, whereby the position of the spot welding gun 14 with respect to the workpiece is changed.

The robot 12 of the present embodiment is a vertical articulated type. The robot 12 includes a base 20 that is placed on a floor surface, and a rotation base 22 that is formed so as to be capable of rotating about an axis line extending in the vertical direction. The robot 12 includes a lower arm 24 that is supported by the rotation base 22 and capable of pivoting, an upper arm 26 that is supported by the lower arm 24 and capable of pivoting, and a wrist 28 that is supported by the upper arm 26 and capable of pivoting. The robot 12 includes robot driving motors 29 that drive the rotation base 22, the lower arm 24, the upper arm 26, and the wrist 28. The robot driving motors 29 drive so as to change the position and the orientation of the robot 12.

Note that the robot is not limited to the above embodiment and any robot that is capable of changing the position and the orientation of the spot welding gun 14 can be employed.

The spot welding gun 14 includes a pair of electrodes that are constituted of a movable electrode 30 and a counter electrode 32 arranged so as to face the movable electrode 30. The spot welding gun 14 includes an electrode driving motor 34 that moves the movable electrode 30. The movable electrode 30 moves in the direction in which the movable electrode 30 faces the counter electrode 32. The electrode driving motor 34 drives so as to move the movable electrode 30 toward or away from the counter electrode 32. The spot welding gun 14 performs a spot weld by applying a voltage between the movable electrode 30 and the counter electrode 32 while the workpiece is sandwiched between the movable electrode 30 and the counter electrode 32.

The spot welding system 10 of the present embodiment includes a tip dresser 40. The tip dresser 40 polishes tips of the electrodes 30 and 32 of the spot welding gun 14. The tip dresser 40 can be placed within a range in which the electrodes 30 and 32 of the spot welding gun 14 can reach the tip dresser 40 by an operation of the robot 12. The tip dresser 40 is formed so as to be capable of communicating with the control device 15 via the communication device. The tip dresser 40 is controlled by the control device 15.

The tip dresser 40 includes a main body part 41 in which a blade 42 is arranged. The tip dresser 40 includes a support member 45 that supports the main body part 41. A bracket 44 is fixed to the support member 45. Springs 46 are arranged above and below the main body part 41. The springs 46 are arranged so as to be capable of extending and contracting in the vertical direction. The main body part 41 is supported by the bracket 44 via the springs 46. The main body part 41 is formed to be capable of moving freely in the vertical direction under the elastic force of the springs 46.

The blade 42 is arranged on an end part of the main body part 41 of the tip dresser 40. The blade 42 is a cutter that cuts the faces of the electrodes 30 and 32. The blade 42 is supported by a cutter holder 47. The blade 42 and the cutter holder 47 are arranged inside a through-hole that is formed in the main body part 41. The blade 42 has a shape that corresponds to the shapes of the tips of the electrodes 30 and 32. The tip dresser 40 according to the present embodiment polishes the movable electrode 30 and the counter electrode 32 simultaneously.

The blade 42 and the cutter holder 47 rotate about a rotation axis 91. The tip dresser 40 includes a blade driving motor 43 that rotates the blade 42. Rotational force of the blade driving motor 43 is transmitted to the cutter holder 47 via the reducer that is arranged inside the main body part 41. The blade 42 rotates integrally with the cutter holder 47.

The spot welding system 10 includes a teaching pendant 37 that is connected to the control device 15 via the communication device. The teaching pendant 37 includes an input part 38 that inputs information relating to the robot 12, the spot welding gun 14, and the tip dresser 40. An operator can input an operation program, determination values, and the like to the control device 15 from the input part 38. The input part 38 is constituted of a keyboard, a dial, and the like. The teaching pendant 37 includes display part 39 that displays information that relates to the robot 12, the spot welding gun 14, and the tip dresser 40.

When the electrodes 30 and 32 are to be polished by the tip dresser 40, the blade driving motor 43 rotates the blade 42. The position and the orientation of the spot welding gun 14 are adjusted by driving the robot 12. The robot 12 places the spot welding gun 14 such that the counter electrode 32 makes contact with a bottom face of the blade 42. The main body part 41 of the tip dresser 40 is supported by the springs 46. The elastic force of the springs 46 is sufficiently lower than a pressing force that is used when the electrodes 30 and 32 are polished. Thus polishing is not started even if one electrode of the two electrodes 30 and 32 makes contact with the blade. The polishing of the electrodes 30 and 32 is started when the blade 42 is sandwiched between the pair of electrodes 30 and 32.

Next, the electrode driving motor 34 moves the movable electrode 30. The movable electrode 30 is brought into contact with the blade 42. Furthermore, the movable electrode 30 is pressed against the blade 42 by torque that is outputted by the electrode driving motor 34. The movable electrode 30 and the counter electrode 32 sandwich the blade 42 with a strong force by the pressing force that is exerted on the movable electrode 30. The tips of the electrodes 30 and 32 are cut by the blade 42 at this time. Since the main body part 41 of the tip dresser 40 moves freely in the vertical direction, the counterforce on the movable electrode 30 from the blade 42 can be set to substantially the same force as the counterforce on the counter electrode 32 from the blade 42. Thus, the two electrodes 30 and 32 can be polished at pressing forces equal to each other.

The polishing of the electrodes 30 and 32 can be carried out for a predetermined length of time. When the polishing of the electrodes 30 and 32 is terminated, the spot welding gun 14 moves the movable electrode 30 so as to separate the movable electrode 30 from the blade 42. The robot 12 then drives so as to separate the counter electrode 32 from the blade 42. The tip dresser 40 can then stop the rotation of the blade 42.

Figure 3:
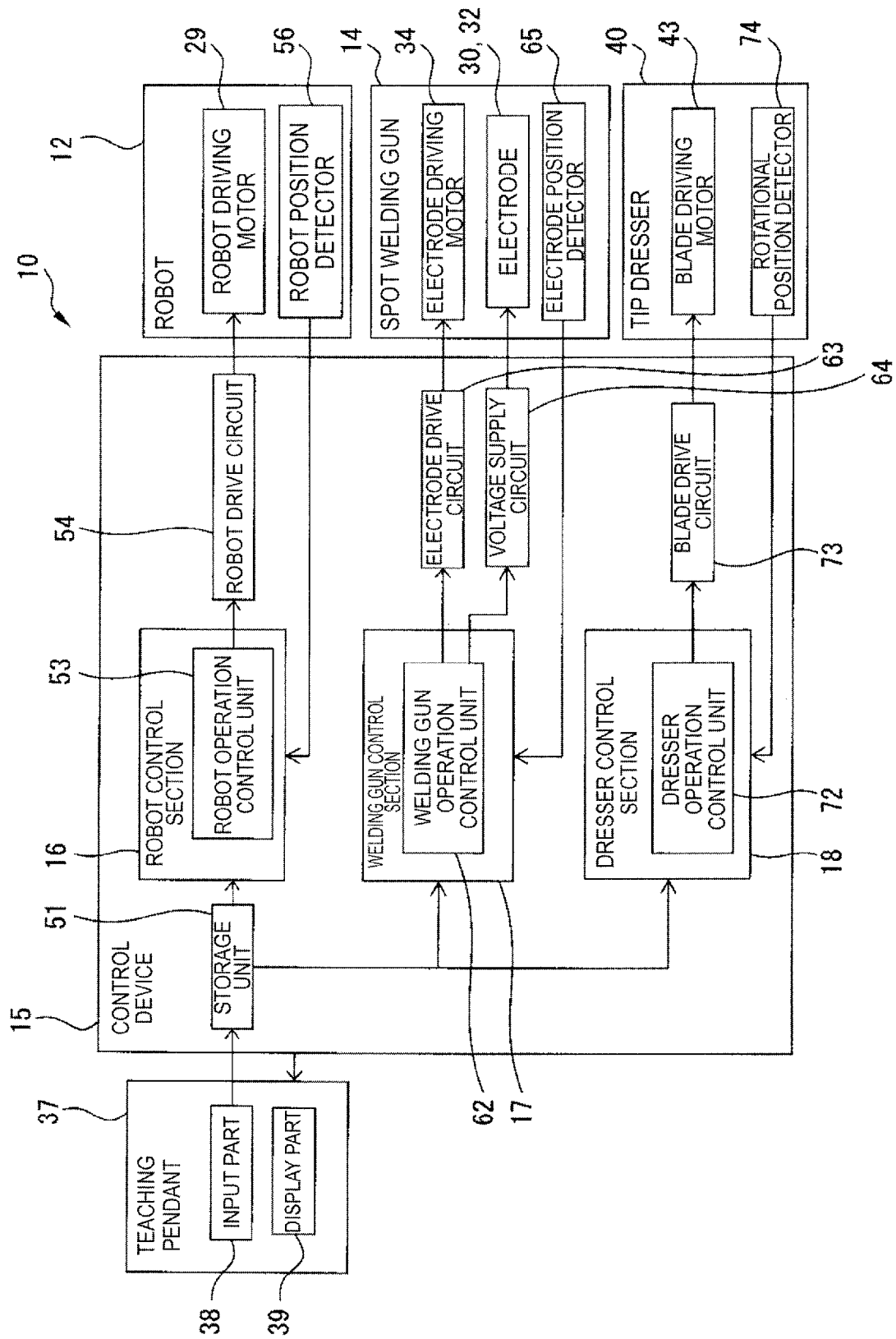
FIG. 3 is a block diagram of the spot welding system according to the embodiment.

FIG. 3 shows a block diagram of the spot welding system of the present embodiment. Referring to FIG. 1 and FIG. 3, the control device 15 includes a storage unit 51 that stores information that relates to the control of the robot 12, the control of the spot welding gun 14, and the control of the tip dresser 40. The operation program and determination values are stored in the storage unit 51.

The control device 15 includes a robot control section 16 that controls the robot 12. The robot control section 16 includes a robot operation control unit 53 that controls the robot driving motors 29. The robot operation control unit 53 sends an operation command based on the operation program to a robot drive circuit 54. The robot drive circuit 54 supplies electricity based on the operation command to the robot driving motors 29.

The robot 12 includes a robot position detector 56 for detecting the position and the orientation of the robot 12. The robot position detector 56 of the present embodiment includes a rotational position detector that is attached to each of the robot driving motors 29. The robot control section 16 receives a signal that relates to a rotational position outputted from the robot position detector 56. The robot control section 16 can detect the position and the orientation of the spot welding gun 14 on the basis of the position and the orientation of the robot 12.

Figure 4:
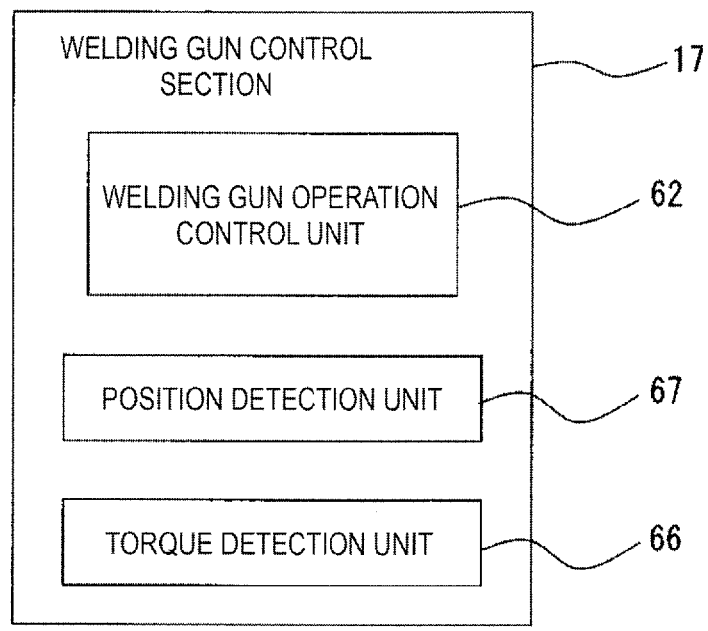
FIG. 4 is a block diagram of a welding gun control section according to the embodiment.

FIG. 4 shows a block diagram of a welding gun control section of the present embodiment. Referring to FIG. 1, FIG. 3, and FIG. 4, the control device 15 includes a welding gun control section 17 that controls the spot welding gun 14. The welding gun control section 17 includes a welding gun operation control unit 62 that controls the electrode driving motor 34 and controls the voltage that is applied to the electrodes 30 and 32. The welding gun operation control unit 62 sends an operation command based on the operation program to an electrode drive circuit 63 and a voltage supply circuit 64. The electrode drive circuit 63 supplies electricity based on the operation command to the electrode driving motor 34. The voltage supply circuit 64 supplies voltages based on the operation command to the movable electrode 30 and the counter electrode 32.

The welding gun control section 17 includes a position detection unit 67 that detects the position of the movable electrode 30. The spot welding gun 14 includes an electrode position detector 65 for detecting the position of the movable electrode 30. The electrode position detector 65 of the present embodiment includes a rotational position detector attached to the electrode driving motor 34. The position detection unit 67 detects the position of the movable electrode 30 on the basis of output of the electrode position detector 65.

The welding gun control section 17 includes a torque detection unit 66 that detects a torque outputted by the electrode driving motor 34. The torque detection unit 66 can detect the torque outputted by the electrode driving motor 34 on the basis of, for example, the operation command that controls the electrode driving motor 34. Alternatively, a current detector that detects a value of current supplied to the electrode driving motor 34 can be provided in the spot welding gun 14. The torque detection unit 66 may calculate the torque on the basis of the current value that is detected by the current detector.

Figure 5:
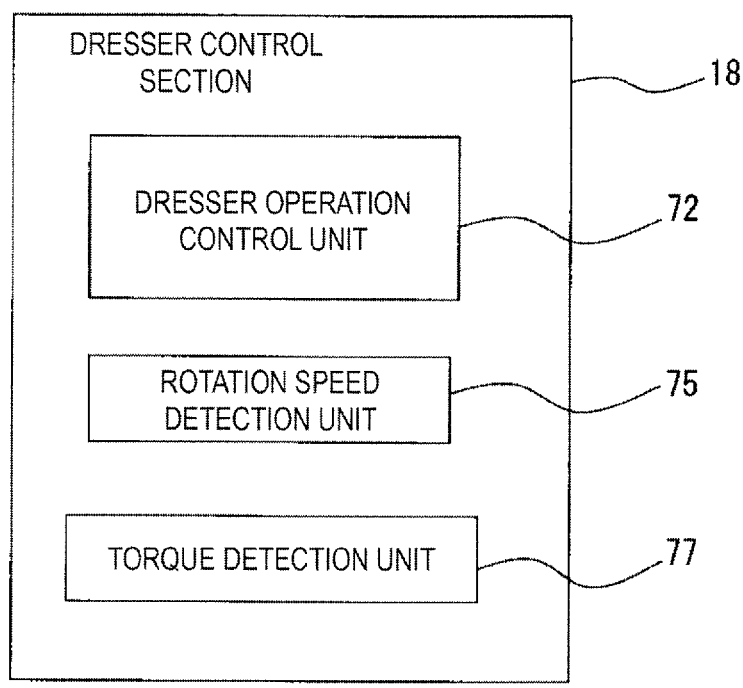
FIG. 5 is a block diagram of a dresser control section according to the embodiment.

FIG. 5 shows a block diagram of a dresser control section according to the present embodiment. Referring to FIG. 1, FIG. 3, and FIG. 5, the control device 15 includes a dresser control section 18 that controls the tip dresser 40. The dresser control section 18 includes a dresser operation control unit 72 that controls the blade driving motor 43. The dresser operation control unit 72 sends an operation command based on the operation program to a blade drive circuit 73. The blade drive circuit 73 supplies electricity based on the operation command to the blade driving motor 43.

The dresser control section 18 includes a rotation speed detection unit 75 that detects the rotation speed of the blade driving motor 43. The tip dresser 40 includes a rotational position detector 74 that detects the rotational position of the blade driving motor 43. The rotational position detector 74 of the present embodiment is attached to the blade driving motor 43. The rotation speed detection unit 75 detects the rotation speed of the blade driving motor 43 on the basis of the output of the rotational position detector 74.

The dresser control section 18 includes a torque detection unit 77 that detects a torque outputted by the blade driving motor 43. The torque detection unit 77 can detect the torque outputted by the blade driving motor 43 on the basis of, for example, the operation command that control the blade driving motor 43. Alternatively, a current detector that detects a value of current supplied to the blade driving motor 43 can be provided in the tip dresser 40. The torque detection unit 77 may calculate the torque on the basis of the current value that is detected by the current detector.

The dresser operation control unit 72 controls the rotation speed of the blade driving motor 43 on the basis of the operation program and a status when the electrode is polished. The torque outputted by the blade driving motor 43 is controlled by controlling the rotation speed of the blade driving motor 43. The torque that is outputted by a motor is dependent on the amount of the current that is supplied to the motor. By adjusting the value of the current supplied to the blade driving motor 43, the dresser operation control unit 72 controls the torque that is outputted by the blade driving motor 43.

Figure 6:
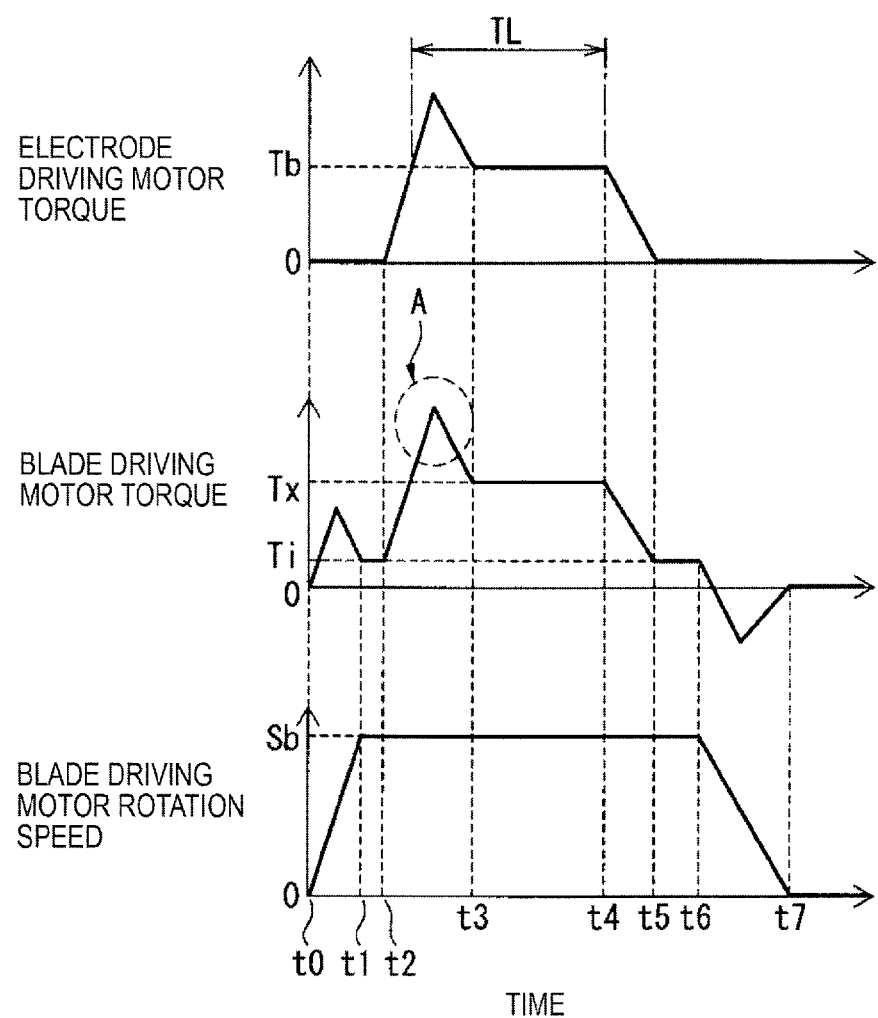
FIG. 6 is a time chart of a control in a first comparative example.

FIG. 6 shows a time chart that illustrates a control of a dresser according to a first comparative example. The torque of the electrode driving motor 34 on the vertical axis corresponds to the amount of current supplied to the electrode driving motor 34. The torque of the electrode driving motor 34 corresponds to the pressing force with which the electrodes 30 and 32 press against the blade 42. The torque of the blade driving motor 43 on the vertical axis corresponds to the amount of current supplied to the blade driving motor 43. The torque that is outputted by the blade driving motor 43 corresponds to a load that is applied to the constituent component of the tip dresser 40. The constituent components of the tip dresser 40 include the blade driving motor 43, a reducer, the blade 42, a shaft bearing, and the like. The rotation speed of the blade driving motor on the vertical axis corresponds to the rotation speed of the blade 42.

At time t0, the dresser operation control unit 72 starts driving the blade driving motor 43. At time t1, the rotation speed of the blade driving motor 43 reaches a predetermined reference rotation speed Sb.

At time t2, the electrodes 30 and 32 make contact with the blade 42 as a result of the operation of the electrode driving motor 34 of the spot welding gun 14. The electrode driving motor 34 moves the movable electrode 30 toward the counter electrode 32. The pressing force of the electrodes 30 and 32 increases. In other words, the torque of the electrode driving motor 34 is increased. The dresser operation control unit 72 carries out a control for keeping the rotation speed of the blade driving motor 43 at the reference rotation speed Sb. The welding gun operation control unit 62 controls the torque that is outputted by the electrode driving motor 34 so that the pressing force of the electrodes 30 and 32 remains constant. The polishing is started substantially when the torque of the electrode driving motor 34 reaches a predetermined reference torque Tb. A polishing time TL is determined in advance.

At time t4, the polishing of the electrodes 30 and 32 is finished. The electrode driving motor 34 moves the movable electrode 30 away from the counter electrode 32. At time t5, the movable electrode 30 is separated from the blade 42. Next, the robot 12 separates the counter electrode 32 from the blade 42. The robot 12 then separates the spot welding gun 14 from the tip dresser 40. At time t6, the dresser operation control unit 72 starts a control for stopping the blade driving motor 43. At time t7, the blade driving motor 43 is completely stopped.

When the electrodes 30 and 32 are polished in this manner, the dresser operation control unit 72 performs a feedback control so that the rotation speed of the blade driving motor 43 remains constant. When the pressing force of the electrodes 30 and 32 increases at and after time t2, a force that reduces the rotation speed of the blade 42 acts on the blade 42. Although the force that reduces the rotation speed of the blade driving motor 43 arises, the dresser operation control unit 72 carries out the control for keeping the rotation speed of the blade driving motor 43 at the reference rotation speed Sb. To that end, the dresser operation control unit 72 increases the current that is supplied to the blade driving motor 43. The torque of the blade driving motor 43 is increased.

The welding gun operation control unit 62 carries out a control so that the pressing force of the electrodes 30 and 32 remains constant. The welding gun operation control unit 62 carries out the control so that the torque that is outputted by the electrode driving motor 34 is the reference torque Tb. The pressing force of the electrodes 30 and 32 is adjusted.

In the control for adjusting the pressing force of the electrodes 30 and 32, the feedback control can be carried out so that the torque that is outputted by the electrode driving motor 34 is the predetermined reference torque Tb. The torque detection unit 66 of the welding gun control section 17 detects the torque that is outputted by the electrode driving motor 34. The welding gun operation control unit 62 calculates a difference between the current torque and the reference torque Tb. The welding gun operation control unit 62 controls the amount of current that is supplied to the electrode driving motor 34 on the basis of the difference between the current torque and the reference torque Tb. When the current torque is lower than the reference torque Tb, the welding gun operation control unit 62 performs a control for increasing the current that is supplied to the electrode driving motor 34. On the other hand, when the current torque is higher than the reference torque Tb, the welding gun operation control unit 62 performs a control for reducing the current that is supplied to the electrode driving motor 34.

Note that in the control for adjusting the pressing force of the electrodes 30 and 32, the control may be carried out by using the value of the current that is supplied to the electrode driving motor 34 instead of the torque. A reference current value that corresponds to the reference torque can be set in advance. The welding gun operation control unit 62 may carry out a control so that the value of the current that is supplied to the electrode driving motor 34 is the predetermined reference current value.

Alternatively, a torque limitation method can be employed in the control for adjusting the pressing force of the electrodes 30 and 32. In the torque limitation method, the welding gun operation control unit 62 moves the movable electrode 30 on the basis of the position of the movable electrode 30. The welding gun operation control unit 62 stops the movement of the movable electrode 30 in the case where the torque outputted by the electrode driving motor 34 reaches the reference torque Tb while the movable electrode 30 is moving. Alternatively, the welding gun operation control unit 62 may move the movable electrode 30 in a direction that is away from the counter electrode 32. A reference position of the movable electrode 30 when the electrodes 30 and 32 are polished is set in advance. The position detection unit 67 of the welding gun control section 17 detects the position of the movable electrode 30. The welding gun operation control unit 62 brings the movable electrode 30 toward the counter electrode 32 on the basis of a difference between the current position and the reference position. At this time, the torque detection unit 66 detects the torque that is outputted by the electrode driving motor 34. The welding gun operation control unit 62 can stop the electrode driving motor 34 when the torque that is outputted by the electrode driving motor 34 reaches the reference torque.

At the start of the polishing, the torque of the electrode driving motor 34 increases from time t2. Even if each of the above-described controls of the pressing force of the electrodes 30 and 32 is employed, there are cases where the torque of the electrode driving motor 34 does not stop rising at the predetermined reference torque Tb. There are cases where the torque of the electrode driving motor 34 temporarily exceeds the reference torque Tb. In other words, there are cases where overshoot arises in the torque of the electrode driving motor 34. Excessive pressing force is exerted on the blade 42. The dresser operation control unit 72 increases the current that is supplied to the blade driving motor 43 so that the rotation speed of the blade driving motor 43 does not decrease. As a result, the torque that is outputted by the blade driving motor 43 is excessive, as indicated by the region A in FIG. 6. There are cases where the excessive load is applied to the constituent component of the tip dresser 40. After the overshoot, the torque of the electrode driving motor 34 returns to the reference torque Tb. Additionally, the torque of the blade driving motor 43 decreases to a torque Tx.

The spot welding system 10 according to the present embodiment controls the tip dresser 40 so that an excessive load is not applied to the constituent component of the tip dresser 40. The dresser control section 18 detects the torque of the blade driving motor 43. When the torque of the blade driving motor 43 exceeds a predetermined torque upper limit value Tt, the dresser control section 18 carries out speed reduction control for reducing the rotation speed of the blade driving motor 43 from the current rotation speed.

Figure 7:
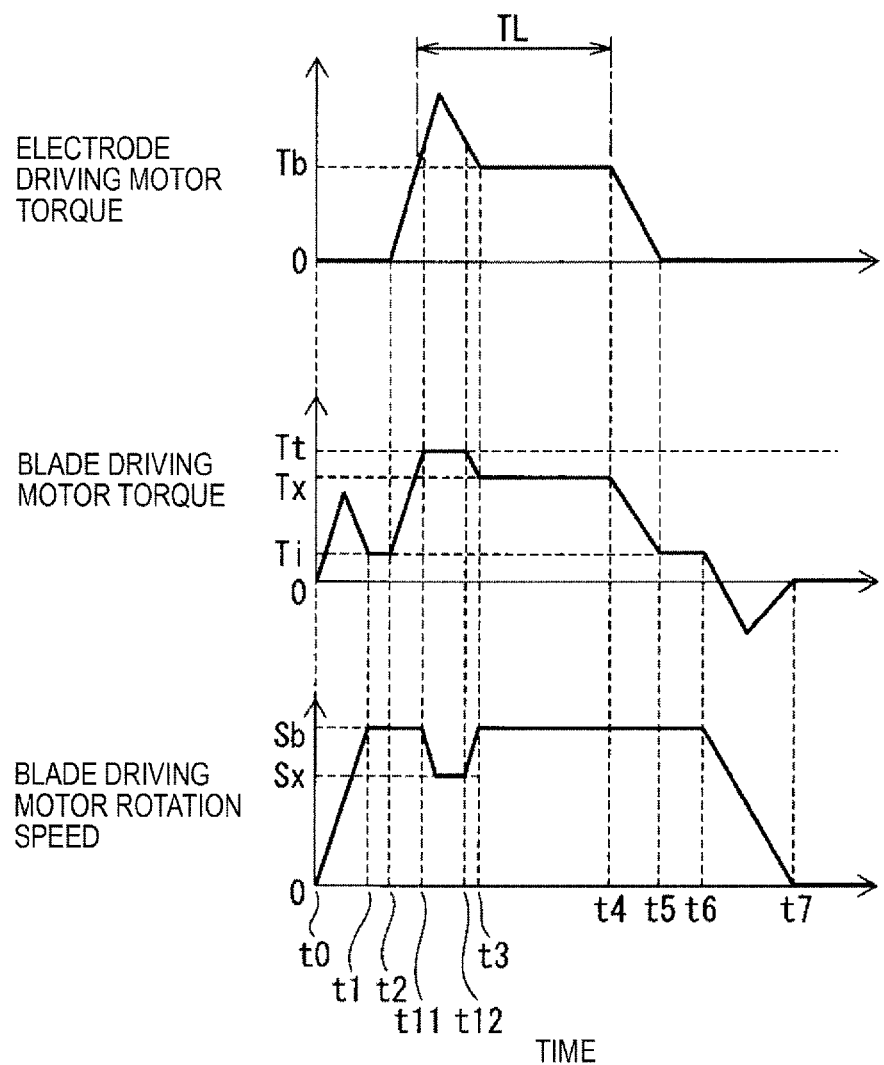
FIG. 7 is a time chart of first control in the spot welding system according to the embodiment.

FIG. 7 shows a time chart of first control according to the present embodiment. In the control of the present embodiment, the welding gun control section 17 carries out a control so that the torque of the electrode driving motor 34 is the reference torque Tb, in the same way as the first comparative example. Additionally, during the normal control, the dresser control section 18 carries out the control so that the rotation speed of the blade driving motor 43 is the reference rotation speed Sb. The control up to time t2 is the same as the control in the above-described first comparative example.

At time t0, the dresser operation control unit 72 starts driving the blade driving motor 43. The torque that is outputted by the blade driving motor 43 is increased. At time t1, the rotation speed of the blade driving motor 43 reaches the predetermined reference rotation speed Sb. This reference rotation speed Sb is included in the operation program.

The rotation speed detection unit 75 detects the rotation speed of the blade driving motor 43. When the rotation speed of the blade driving motor 43 is lower than the reference rotation speed Sb, the dresser operation control unit 72 carries out the control for increasing the current that is supplied to the blade driving motor 43 so that the rotation speed of the blade driving motor 43 is the reference rotation speed Sb. When the rotation speed of the blade driving motor 43 is higher than the reference rotation speed Sb, the dresser operation control unit 72 performs the control for reducing the current that is supplied to the blade driving motor 43.

The rotation speed increases when the blade driving motor 43 is started in the period from time t0 to time t1. As a result, the torque of the blade driving motor 43 temporarily increases. After this, the torque of the blade driving motor 43 decreases to a torque Ti. The torque Ti is a torque arising when the blade 42 is idling at a predetermined speed. Next, the counter electrode 32 makes contact with the blade 42 by the operation of the robot 12.

At time t2, the welding gun operation control unit 62 moves the movable electrode 30. The movable electrode 30 and the counter electrode 32 make contact with the blade 42. The pressure on the electrodes 30 and 32 increases in accordance with the movement of the movable electrode 30. The torque detection unit 66 of the welding gun control section 17 detects the torque of the electrode driving motor 34. The welding gun operation control unit 62 adjusts the current that is supplied to the electrode driving motor 34 so that the torque of the electrode driving motor 34 is the reference torque Tb. The reference torque Tb is set in advance. The reference torque Tb is defined in the operation program. Due to the increase in the current that is supplied to the electrode driving motor 34, the pressing force of the electrodes 30 and 32 also increases. As a result, the load of the blade driving motor 43 that rotates the blade 42 increases.

The torque detection unit 77 of the dresser control section 18 of the present embodiment detects the torque outputted by the blade driving motor 43. The torque of the blade driving motor 43 increases from time t2. The torque upper limit value Tt of the blade driving motor 43 is defined in the operation program. The torque upper limit value Tt is set in advance on the basis of the load that is applied to the constituent components of the tip dresser 40. The torque upper limit value Tt is set so that the constituent components are not damaged, do not suffer shortened lifespans, and the like. The torque upper limit value Tt is set so as to be higher than the torque Tx during normal polishing.

The overshoot arises in the torque of the electrode driving motor 34 such that the torque is greater than the reference torque Tb. At time t11, the dresser operation control unit 72 detects that the torque outputted by the blade driving motor 43 reaches the torque upper limit value Tt. The dresser operation control unit 72 of the present embodiment carries out the control for reducing the rotation speed of the blade driving motor 43.

The dresser operation control unit 72 reduces the rotation speed of the blade driving motor 43 so that the torque of the blade driving motor 43 does not exceed the torque upper limit value Tt. The torque of the blade driving motor 43 is kept at the torque upper limit value Tt. In the example illustrated in FIG. 7, the rotation speed of the blade driving motor 43 decreases to a rotation speed Sx. In this manner, the dresser control section 18 carries out the speed reduction control that reduces the rotation speed of the blade driving motor 43. By performing this control, the torque that is outputted by the blade driving motor 43 can be prevented from becoming excessive. As a result, an excessive load can be prevented from being applied to the constituent components of the tip dresser 40. This makes it possible to prevent the constituent components of the tip dresser 40 from being damaged, suffering shortened lifespans, and the like.

The torque of the electrode driving motor 34 decreases after temporarily increasing due to the overshoot. The torque of the electrode driving motor 34 decreases to the reference torque Tb. At time t3, the torque of the electrode driving motor 34 is the reference torque Tb. When the torque of the electrode driving motor 34 decreases, the pressing force of the electrodes 30 and 32 also decreases. The load that is applied to the blade driving motor 43 decreases as a result. Accordingly, the torque of the blade driving motor 43 decreases so as to be less than the torque upper limit value Tt.

The torque detection unit 77 of the dresser control section 18 of the present embodiment detects the torque of the blade driving motor 43 after the speed reduction control is carried out. At time t12, the dresser operation control unit 72 detects that the torque of the blade driving motor 43 is less than the torque upper limit value Tt. Then, the dresser control section 18 carries out the speed increase control that increases the rotation speed of the blade driving motor 43. As the torque of the electrode driving motor 34 decreases, the rotation speed of the blade driving motor 43 increases to the reference rotation speed Sb. At time t3, the rotation speed of the blade driving motor 43 is the reference rotation speed Sb. The torque that is outputted by the blade driving motor 43 at this time is the torque Tx. The torque Tx is lower than the torque upper limit value Tt.

In the present embodiment, the polishing time TL, which is the time for which polishing is carried out, is set in advance. In the example illustrated in FIG. 7, the time at which the torque of the electrode driving motor 34 reaches the reference torque Tb is the start time of the polishing.

The welding gun control section 17 detects that the polishing time TL has elapsed from the start time of the polishing. At time t4, the welding gun control section 17 detects that the current time is a polishing end time for the electrodes 30 and 32. The welding gun operation control unit 62 drives the electrode driving motor 34 so as to separates the movable electrode 30 from the blade 42. The pressing force of the electrodes 30 and 32 decreases. The electrode driving motor 34 stops after the movable electrode 30 separates from the blade 42. At time t5, the torque of the electrode driving motor 34 is zero. In the tip dresser 40, the rotation speed of the blade driving motor 43 is kept constant, and thus the torque of the blade driving motor 43 decreases. At time t5, the torque of the blade driving motor 43 is the idling torque Ti. The robot operation control unit 53 drives the robot 12 so as to separate the counter electrode 32 from the blade 42.

At time t6, the dresser control section 18 starts control for stopping the blade driving motor 43. The rotation speed of the blade driving motor 43 decreases from time t6. At time t7, the rotation speed of the blade driving motor 43 is zero. In other words, at time t7, the blade driving motor 43 completely stops.

Figure 8:
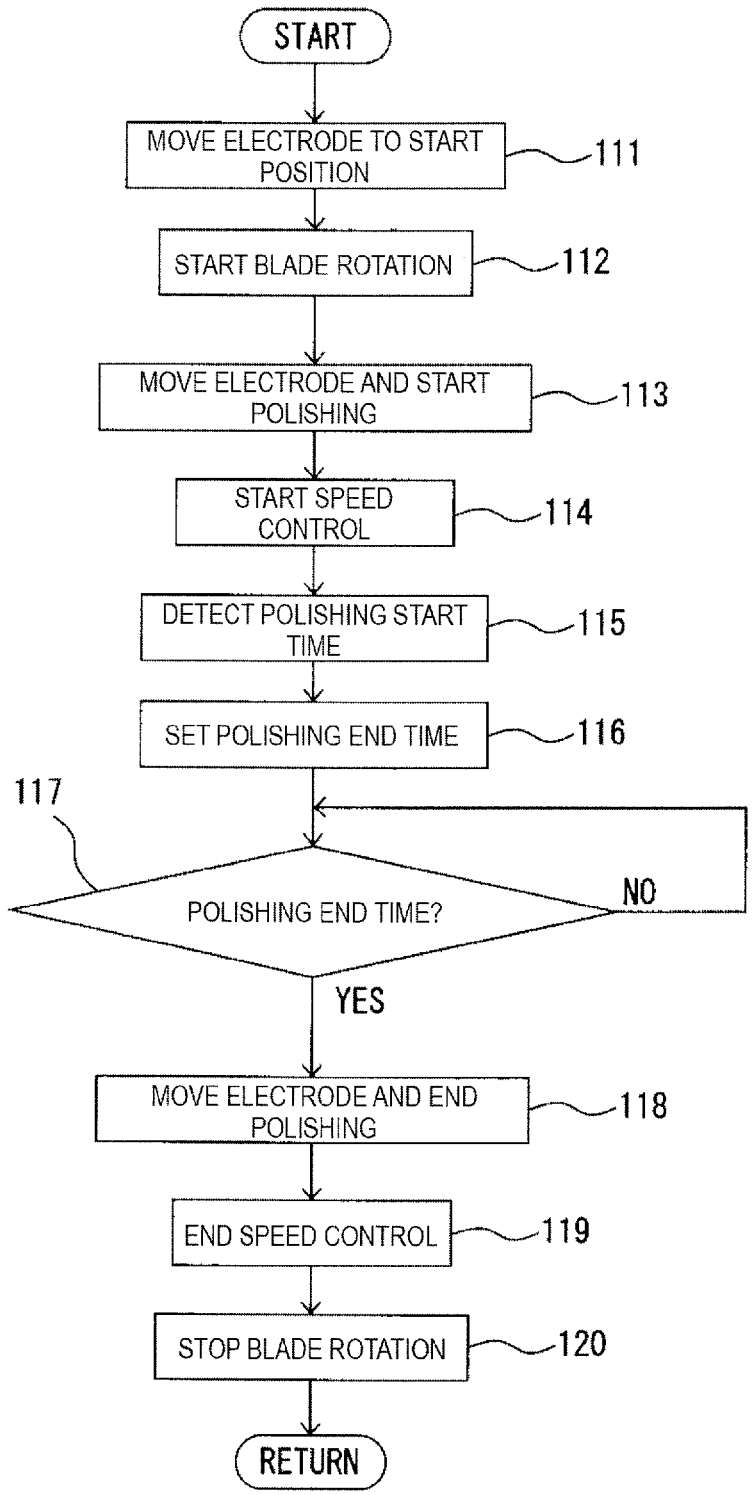
FIG. 8 is a flowchart of a control in the spot welding system according to the embodiment.

FIG. 8 shows a flowchart of a control in the spot welding system according to the present embodiment. In step 111, the robot control section 16 drives the robot 12 so as to change the position and the orientation of the robot 12. The robot 12 arranges the electrodes 30 and 32 at a predetermined start position.

In step 112, the dresser control section 18 starts rotation of the blade 42. In step 113, the welding gun control section 17 moves the movable electrode 30 and starts the polishing. At this time, the welding gun operation control unit 62 moves the movable electrode 30 so that the pressing force of the electrodes 30 and 32 is a predetermined reference value. The welding gun operation control unit 62 controls the current that is supplied to the electrode driving motor 34.

Next, in step 114, the dresser control section 18 starts the speed control. In the present embodiment, the speed control is started when the electrodes 30 and 32 make contact with the blade 42 of the tip dresser 40. The welding gun control section 17 sends a signal for starting the speed control to the dresser control section 18 when the movable electrode 30 makes contact with the blade 42. The speed control of the present embodiment includes the speed reduction control and the speed increase control. Note that the speed increase control need not be carried out in the speed control.

Figure 9:
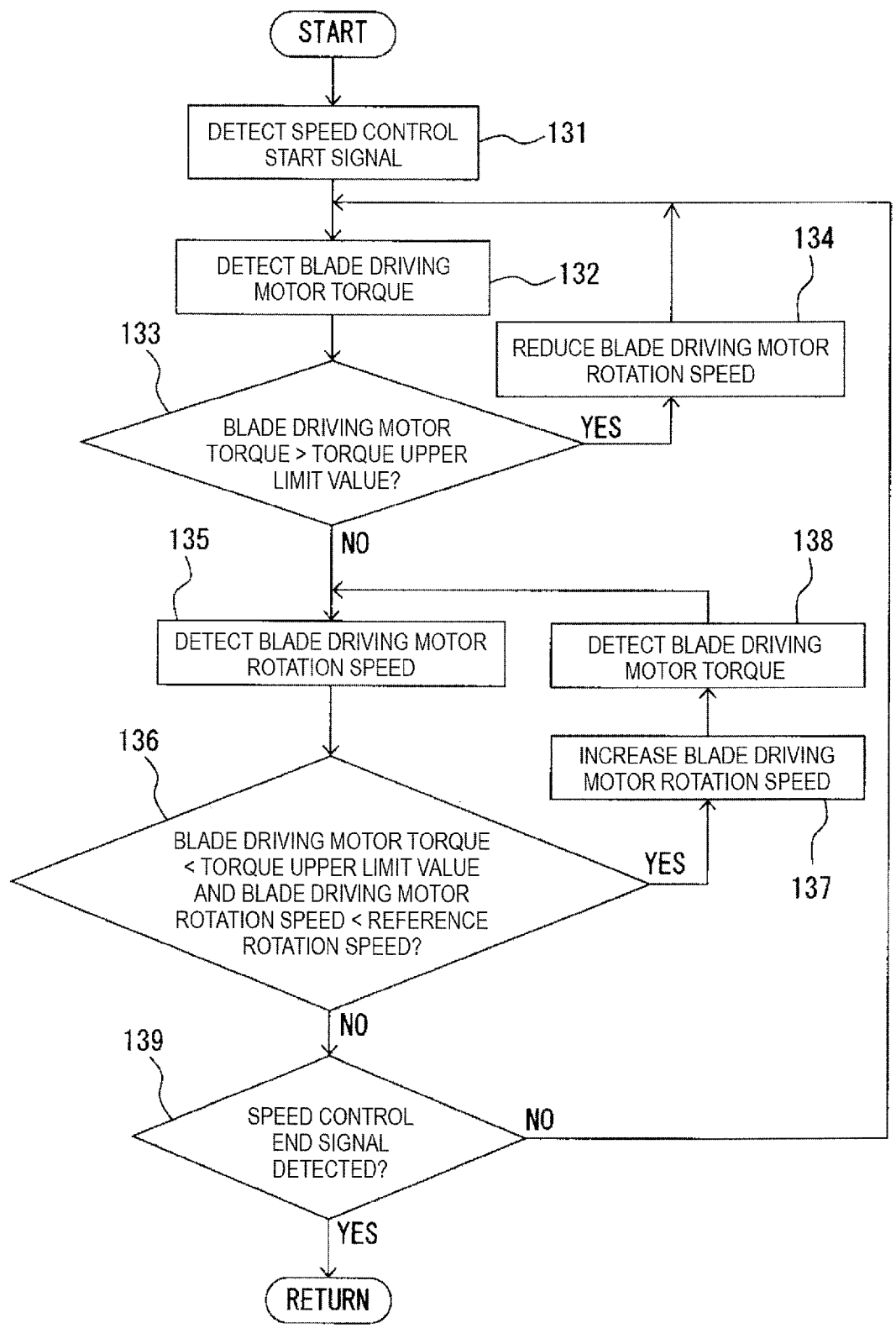
FIG. 9 is a flowchart of a speed control in the tip dresser according to the embodiment.

FIG. 9 shows a flowchart of the speed control of the present embodiment. In step 131, the dresser control section 18 detects the signal for starting the speed control. First, the dresser control section 18 carries out the speed reduction control. In step 132, the torque detection unit 77 of the dresser control section 18 detects the torque that is outputted by the blade driving motor 43.

Next, in step 133, the dresser control section 18 determines whether or not the torque of the blade driving motor 43 is greater than the torque upper limit value Tt. In other words, the dresser control section 18 determines whether or not the blade driving motor 43 is outputting excessive torque. When the torque that is outputted by the blade driving motor 43 is greater than the torque upper limit value Tt in step 133, the control proceeds to step 134.

In step 134, the dresser operation control unit 72 reduces the rotation speed of the blade driving motor 43. In the control for reducing the rotation speed of the blade driving motor 43, the rotation speed can be reduced by any method. For example, the dresser operation control unit 72 can carry out a control for reducing the rotation speed by a predetermined reduction amount. Alternatively, the dresser operation control unit 72 may set a reduction amount on the basis of a difference between the current torque of the blade driving motor 43 and the torque upper limit value. The dresser operation control unit 72 can carry out a control that increases the reduction amount as the difference between the torque of the blade driving motor 43 and the torque upper limit value increases. Next, the control returns to step 132, where the torque of the blade driving motor 43 is detected. This speed reduction control is continued until the torque of the blade driving motor 43 is less than or equal to the torque upper limit value Tt.

When the torque that is outputted by the blade driving motor 43 is less than or equal to the torque upper limit value Tt in step 133, the control proceeds to step 135. Next, the dresser control section 18 carries out the speed increase control. In step 135, the rotation speed detection unit 75 of the dresser control section 18 detects the rotation speed of the blade driving motor 43.

In step 136, the dresser control section 18 determines whether or not the torque of the blade driving motor 43 is lower than the torque upper limit value Tt. Furthermore, the dresser control section 18 determines whether or not the rotation speed of the blade driving motor 43 is lower than the reference rotation speed Sb. When the torque of the blade driving motor 43 is lower than the torque upper limit value and the rotation speed of the blade driving motor 43 is lower than the reference rotation speed, the control proceeds to step 137. Note that the control proceeds to step 139 when the torque of the blade driving motor 43 is the torque upper limit value Tt.

In step 137, the dresser operation control unit 72 carries out the control for increasing the rotation speed of the blade driving motor 43. In the control for increasing the rotation speed of the blade driving motor 43, the rotation speed can be increased by any method. For example, a control for increasing the rotation speed by a predetermined increase amount can be carried out. Alternatively, the dresser operation control unit 72 may set the increase amount on the basis of a difference between the current torque of the blade driving motor 43 and the torque upper limit value.

Next, in step 138, the torque detection unit 77 detects the torque of the blade driving motor 43. The control returns to step 135. This speed increase control is continued until the rotation speed of the blade driving motor 43 reaches the reference rotation speed. Alternatively, the speed increase control is continued until the torque of the blade driving motor 43 is greater than or equal to the torque upper limit value.

In step 136, when the torque of the blade driving motor 43 is greater than or equal to the torque upper limit value or the rotation speed of the blade driving motor 43 is greater than or equal to the reference rotation speed, the control proceeds to step 139. In step 139, the dresser control section 18 determines whether or not an end signal of the speed control is received. The control returns to step 132 when the end signal of the speed control is not received. The dresser control section 18 then carries out the speed reduction control, the speed increase control, or the control for maintaining the current rotation speed.

When the end signal of the speed control is received in step 139, the speed control is ended. The speed control can be carried out in this manner. The speed control can be started at any time. Likewise, the speed control can be ended at any time.

Referring to FIG. 8, after the speed control is started in step 114, the welding gun control section 17 detects the polishing start time in step 115. In the present embodiment, the welding gun control section 17 detects the time at which the torque of the electrode driving motor 34 reaches the reference torque Tb. The welding gun control section 17 sets that time as the polishing start time. In step 116, the welding gun control section 17 sets the polishing end time. In the present embodiment, a time at which the predetermined polishing time TL has elapsed from the polishing start time is set as the polishing end time.

Note that the polishing start time and the polishing end time can be set within any period in which the electrodes 30 and 32 are pressed against the blade 42. For example, the time at which the movable electrode makes contact with the blade may be set as the polishing start time. Likewise, a time at which a predetermined amount of time has elapsed from the time at which the movable electrode makes contact with the blade may be set as the polishing end time.

Next, in step 117, the welding gun control section 17 determines whether or not the polishing end time is reached. When the current time is not the polishing end time in step 117, the control of step 117 is repeated. In other words, the tip dresser 40 continues polishing the electrodes 30 and 32 while the speed control is carried out. When the current time is the polishing end time in step 117, the control proceeds to step 118.

In step 118, the welding gun operation control unit 62 separates the movable electrode 30 from the blade 42 and ends the polishing. The robot operation control unit 53 controls the position and the orientation of the robot 12 so that the counter electrode 32 separates from the blade 42.

Next, in step 119, the dresser control section 18 ends the speed control. After the withdrawal of the robot 12 is complete, the robot control section 16 sends a signal indicating that the withdrawal of the robot 12 is completed to the dresser control section 18. The dresser control section 18 receives the signal indicating that the withdrawal of the robot 12 is completed, and ends the speed control.

Next, in step 120, the dresser operation control unit 72 stops the rotation of the blade 42. The dresser operation control unit 72 stops the supply of electricity to the blade driving motor 43.

In this manner, by setting a limit on the torque that is exerted on the blade, the spot welding system of the present embodiment can prevent the excessive load from being applied to the constituent component of the tip dresser. The spot welding system of the present embodiment can protect the constituent component of the tip dresser.

Next, another example in which the torque that is outputted by the blade driving motor is excessive will be described. In this other example, the blade of the tip dresser is degraded.

Figure 10:
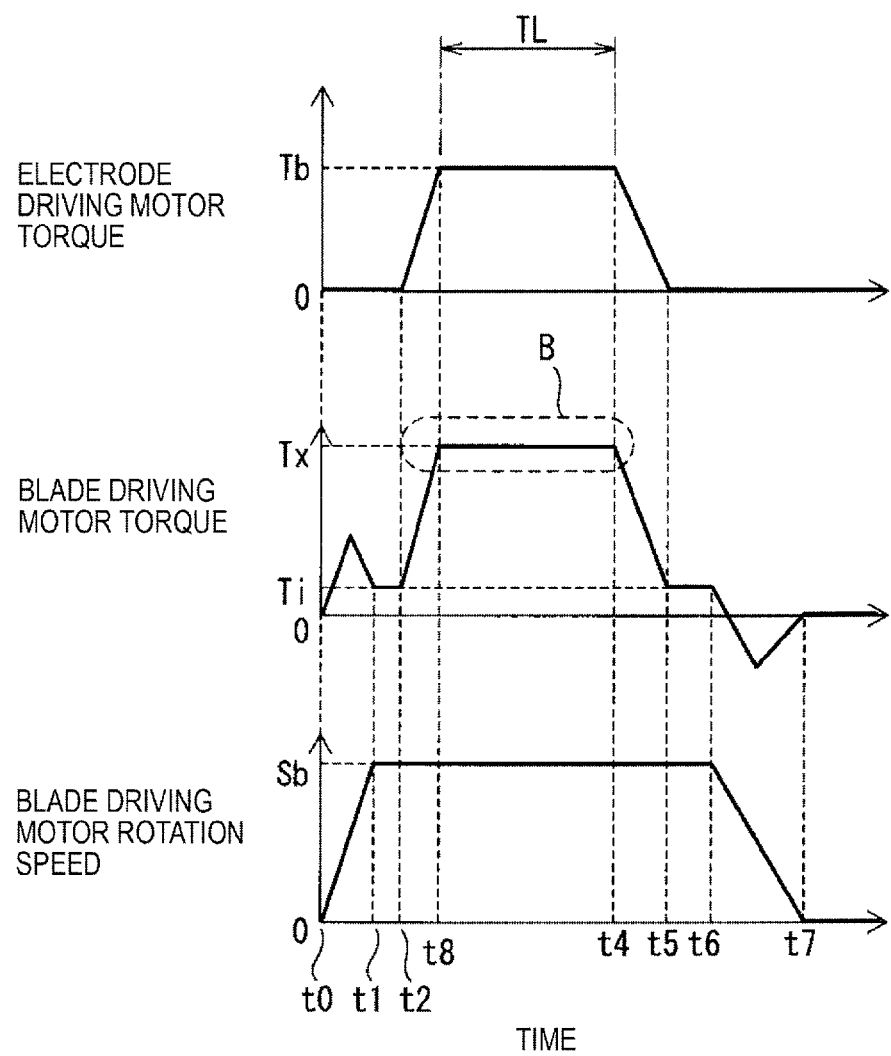
FIG. 10 is a time chart of a control in a second comparative example.

FIG. 10 shows a time chart of a control of a second comparative example. The control of the second comparative example is the same as the control of the first comparative example up to time t2. At time t2, the blade 42 is sandwiched by the electrodes 30 and 32. In the second comparative example, no overshoot arises in the torque of the electrode driving motor 34. At time t8, the torque of the electrode driving motor 34 reaches the reference torque Tb. The polishing of the electrodes 30 and 32 is carried out until time t4.

When the blade 42 of the tip dresser 40 is degraded due to a long period of usage or the like, the cutting performance of the blade 42 drops. When a degraded blade 42 is used, a load applied to the blade 42 is greater than a load applied to the blade 42 when a proper blade 42 is used. The torque of the blade driving motor 43 rises during the period from time t2 to time t8. As indicated by a region B, a high torque for the blade driving motor 43 is required in order to keep the rotation speed of the blade driving motor 43 at the reference rotation speed Sb. The current that is supplied to the blade driving motor 43 increases in order to keep the rotation speed of the blade driving motor 43 at the reference rotation speed Sb. The torque Tx in the region B is greater than the torque upper limit value Tt. As such, in the region B, an excessive load is applied to the constituent component of the tip dresser 40.

Figure 11:
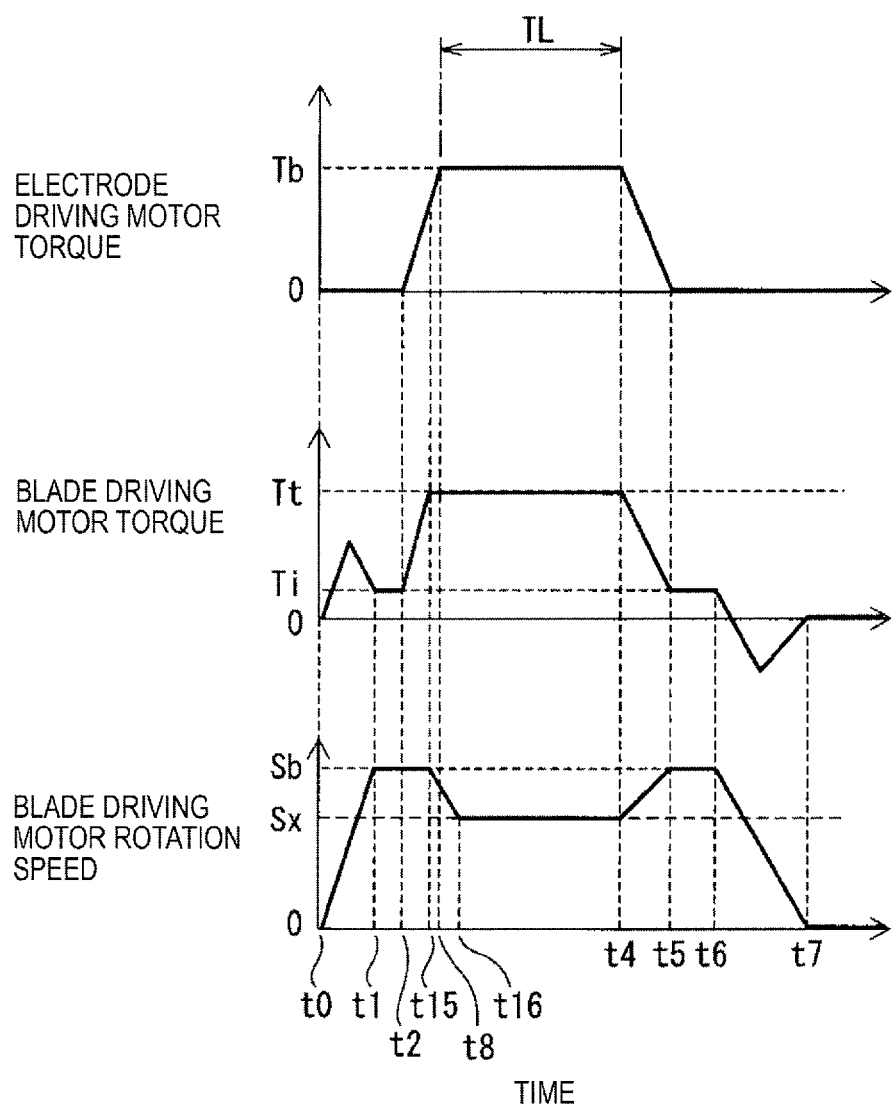
FIG. 11 is a time chart of second control in the spot welding system according to the embodiment.

FIG. 11 shows a time chart of second control according to the present embodiment. In the second control, the same speed control as in the first control is carried out. At time t2, the dresser control section 18 starts the speed control. At time t15, the torque of the blade driving motor 43 reaches the torque upper limit value Tt. Accordingly, the dresser operation control unit 72 performs the speed reduction control that reduces the rotation speed of the blade driving motor 43. At time t16, the rotation speed reaches to the rotation speed Sx at which the torque of the blade driving motor 43 can be kept substantially constant.

At time t4, the welding gun control section 17 detects that the current time is a time at which the polishing of the electrodes 30 and 32 is terminated. The welding gun operation control unit 62 moves the movable electrode 30 in a direction that is away from the blade 42. The pressing force of the electrodes 30 and 32 decreases, and the load on the blade 42 also decreases. The torque that is outputted by the blade driving motor 43 is less than the torque upper limit value Tt. Accordingly, the dresser operation control unit 72 performs the speed increase control that increases the rotation speed of the blade driving motor 43. At time t5, the torque of the electrode driving motor 34 is zero. Additionally, at time t5, the rotation speed of the blade driving motor 43 reaches the reference rotation speed Sb.

In this manner, even in the case where the cutting performance of the blade is decreased, an excessive load can be prevented from being applied to the constituent component of the tip dresser by applying the speed control according to the present embodiment.

Referring to FIG. 7 and FIG. 11, in the present embodiment, the dresser control section 18 starts the speed reduction control when the electrodes 30 and 32 of the spot welding gun 14 start pressing against the blade 42. By performing this control, a situation in which the speed reduction control is carried out during a period before the polishing of the electrodes 30 and 32 is started can be avoided. In particular, a situation in which the speed reduction control is carried out in a period where the blade driving motor 43 is started and the rotation speed increases can be avoided. Thus, a situation in which it takes more time for the rotation speed of the blade driving motor 43 to increase to the reference rotation speed can be avoided.

Additionally, in the speed control of the present embodiment, the speed increase control is carried out in addition to the speed reduction control. By carrying out such control, a situation in which the polishing amount of the electrodes 30 and 32 drops due to a decrease in the rotation speed of the blade 42 can be prevented. In particular, in the first control of the present embodiment, control can be carried out in which the rotation speed of the blade 42 is reduced only in a period where overshoot arises in the electrode driving motor 34.

In the speed reduction control of the present embodiment, the rotation speed of the blade 42 is reduced so that the torque of the blade driving motor 43 does not exceed the torque upper limit value Tt. In this case, there are cases where the reduction amount in the rotation speed of the blade 42 is large. For example, the reduction amount in the rotation speed of the blade 42 increases in the case where a foreign matter is caught between the electrodes 30 and 32 and the blade 42. If the rotation speed of the blade 42 is too low, there is a risk that the polishing cannot be carried out properly. Accordingly, the rotation speed detection unit 75 of the dresser control section 18 can detect the rotation speed of the blade driving motor 43. The dresser control section 18 can output a warning signal to another device when the detected rotation speed is lower than a predetermined speed lower limit value. The speed lower limit value is a value lower than the reference rotation speed Sb, and can be defined in the operation program. By adopting this control, a situation in which the polishing is continued in a state where proper polishing is not carried out can be avoided.

For example, the dresser control section 18 can output the warning signal to the teaching pendant 37. The teaching pendant 37 can display, in the display part 39, information indicating that the rotation speed of the blade driving motor 43 is low. The operator can carry out an inspection or the like on the tip dresser 40 after viewing the warning that is displayed in the display part 39. The other device to which the warning signal is outputted is not limited to the teaching pendant, and the signal can be outputted to any device.

When the dresser control section 18 carries out the speed reduction control, the rotation speed of the blade 42 decreases and there is a risk that the electrodes 30 and 32 cannot be polished to a sufficient degree. The initial polishing time TL is set in advance. The dresser control section 18 of the present embodiment can carry out a control for lengthening the polishing time TL after the speed reduction control is carried out.

Referring to FIG. 11, in the example of the second control, the rotation speed of the blade 42 decreases in the case where the speed reduction control is carried out. The torque that is exerted on the blade 42 is constant, but the rotation speed of the blade 42 decreases. Accordingly, the dresser control section 18 can carry out the control for lengthening the polishing time TL. For example, the dresser control section 18 can set a new polishing time by adding a predetermined extension time to the current polishing time TL. Alternatively, the dresser control section 18 can set the extension time of the polishing time TL on the basis of the amount of decrease in the rotation speed of the blade driving motor 43. The dresser control section 18 can set the extension time to be longer as the amount of decrease in the rotation speed of the blade driving motor 43 increases. The dresser control section 18 can set the new polishing time by adding the extension time to the initial polishing time.

Note that in the control for lengthening the polishing time TL, a determination value for the rotation speed of the blade driving motor 43 may be set. The control for lengthening the polishing time TL may be carried out in the case where the rotation speed of the blade driving motor 43 is less than the determination value. This determination value can be set so as to be lower than the reference rotation speed Sb of the blade driving motor 43. Additionally, the determination value can be set to a higher value than the above-described speed lower limit value.

In the spot welding gun according to the present embodiment, when polishing is carried out, one of the electrodes is moved while the other electrode remains in a fixed position. The spot welding gun of the aspect of the present embodiment is what is known as a "C-type" spot welding gun, but the spot welding gun is not limited to this aspect. The spot welding gun may be formed such that both electrodes move. For example, the spot welding gun may be an "X-type" spot welding gun in which gun arms are attached to both sides of a pressure cylinder. In the case where both electrodes move, one electrode can be brought into contact with the blade, and then the other electrode can be brought into contact with the blade. Alternatively, both electrodes can be brought into contact with the blade simultaneously.

Additionally, although the tip dresser according to the present embodiment is formed so as to polish two electrodes simultaneously, the tip dresser is not limited to this aspect. The tip dresser may be formed so as to polish only one electrode at a time. In other words, the tip dresser may be formed so as to polish one electrode, and then polish the other electrode thereafter. In this case, the main body part of the tip dresser can be fixed to a support member, and the electrode can be brought into contact with the blade from a predetermined direction.

In the present embodiment, the robot 12, the spot welding gun 14, and the tip dresser 40 are controlled by the single control device 15, but the configuration is not limited to this aspect. The control device can include a robot control device having the functions of a robot control section, a welding gun control device having the functions of a welding gun control section, and a dresser control device having the functions of a dresser control section. The robot control device, the welding gun control device, and the dresser control device can be formed so as to communicate with each other via the communication device. Alternatively, the control of the electrode driving motor of the spot welding gun may be carried out as a control axis that is provided in the robot.

According to an aspect of the present disclosure, a spot welding system that prevents an excessive load from being applied to constituent component of a tip dresser can be provided.

The sequence of steps may be changed as appropriate in each control described above, within a range such that the function and the operation are not changed.

The above-described embodiments can be combined as appropriate. Identical or equivalent parts are given identical reference numerals in the above-described drawings. Note that the above-described embodiments are merely examples and are not intended to limit the invention. Changes to the embodiments as indicated in the claims are also included in the embodiments.

The invention claimed is:

1. A spot welding system comprising:
   a spot welding gun that includes a pair of electrodes arranged so as a tip of each electrode of the pair of electrodes faces each other;
   a robot configured to change a position and an orientation of the spot welding gun;
   a tip dresser configured to polish a face of said tip of said electrode of the pair of electrodes; and
   a control device configured to control the spot welding gun and the tip dresser; wherein
   the spot welding gun includes an electrode driving motor configured to drive said electrode,
   wherein the tip dresser includes a blade configured to cut the face of said tip of said electrode and a blade driving motor configured to rotate the blade, a torque of the blade driving motor increases when the blade driving motor is started, and then decreases so as to be a torque value at the time when the blade driving motor drives in an idling state at a predetermined reference speed, and
   wherein while the pair of electrodes of the spot welding gun start to be pressed against the blade, the control device is configured to:
   a) detect, by a torque detector of the control device, the torque of the blade driving motor,
   b) compare, by a processor of the control device, the torque of the blade driving motor to a predetermined torque upper limit value of the blade driving motor, the predetermined torque upper limit value corresponding to an occurrence of damage or reduction in lifespan due to excessive load applied to a constituent component of the tip dresser,
   c) when the torque of the blade driving motor is greater than the predetermined torque upper limit value, adjust, by the processor, a current supplied to the blade driving motor so as to reduce a rotation speed of the blade driving motor, and repeat (a) and (b),
   d) when the torque of the blade driving motor is less than the predetermined torque upper limit value:
      d2) detect, by a rotation speed detector of the control device, the rotation speed of the blade driving motor, and
      d1) compare, by the processor, the rotation speed of the blade driving motor to the predetermined reference speed,
   e) when the rotation speed of the blade driving motor is less than the predetermined reference speed, adjust, by the processor, the current supplied to the blade driving motor so as to increase the rotation speed of the blade driving motor, detect, by the torque detector, the torque of the blade driving motor, and repeat (d1) and (d2), and
   f) when the rotation speed of the blade driving motor is not less than the predetermined reference speed, repeat, by the processor and the torque detector, (a) and (b).

2. The spot welding system according to claim 1, wherein processor is further configured to output a warning signal to another device when the detected rotation speed is lower than a predetermined speed lower limit value.

3. The spot welding system according to claim 1, wherein a polishing time for polishing said electrode is set in advance; and the processor is further configured to lengthen the polishing time in the case where the speed reduction control is carried out.

4. The spot welding system according to claim 1, wherein the torque detector is further configured to detect the torque of the blade driving motor after the speed reduction control is carried out, and the processor is further configured to carry out speed increase control that increases the rotation speed of the blade driving motor when the torque of the blade driving motor is lower than the torque upper limit value.

* * * * *